United States Patent
El Chebib et al.

(10) Patent No.: US 11,160,120 B2
(45) Date of Patent: Oct. 26, 2021

(54) SYSTEMS AND METHODS FOR DYNAMIC PRIORITIZED TRANSMISSION AND RECEIPT OF DATA PACKETS TO AND FROM A RADIO ACCESS NETWORK DURING AN ATTACH PROCEDURE

(71) Applicant: Verizon Patent and Licensing Inc., Arlington, VA (US)

(72) Inventors: Nader El Chebib, Whittier, CA (US); Edwin Ratchaganathan, Noblesville, IN (US); Michael A. Lombardo, Bethlehem, PA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 54 days.

(21) Appl. No.: 16/825,367

(22) Filed: Mar. 20, 2020

(65) Prior Publication Data
US 2021/0298082 A1    Sep. 23, 2021

(51) Int. Cl.
*H04W 76/19* (2018.01)
*H04W 74/08* (2009.01)
*H04W 74/00* (2009.01)
*H04B 17/318* (2015.01)

(52) U.S. Cl.
CPC ...... *H04W 74/0833* (2013.01); *H04B 17/318* (2015.01); *H04W 74/004* (2013.01); *H04W 74/008* (2013.01); *H04W 74/0866* (2013.01); *H04W 76/19* (2018.02)

(58) Field of Classification Search
CPC .......... H04L 43/0811; H04W 28/0819; H04W 28/10; H04W 36/0011; H04W 36/24; H04W 4/50; H04W 76/00; H04W 76/20; H04W 8/26
See application file for complete search history.

(56) References Cited

U.S. PATENT DOCUMENTS

| | | | |
|---|---|---|---|
| 11,051,277 B2 * | 6/2021 | Baghel | H04L 67/18 |
| 2013/0344872 A1 * | 12/2013 | Nukala | H04W 52/0238 455/437 |
| 2016/0150393 A1 * | 5/2016 | Ratcliffe | H04W 76/19 455/435.1 |
| 2016/0345218 A1 * | 11/2016 | Panchal | H04W 36/023 |
| 2017/0332192 A1 * | 11/2017 | Edge | H04W 4/029 |
| 2018/0352594 A1 * | 12/2018 | Iwai | H04W 76/12 |
| 2019/0335397 A1 * | 10/2019 | Ganesan | H04W 68/02 |
| 2020/0280836 A1 * | 9/2020 | Velev | H04W 8/12 |
| 2021/0092650 A1 * | 3/2021 | Ramamurthi | H04W 36/08 |

* cited by examiner

*Primary Examiner* — Liton Miah (57) ABSTRACT

A user equipment (UE) may receive, during release from a radio access network (RAN), resource information associated with attaching to the RAN, wherein the resource information is received based on the device being authenticated. The UE may store the resource information in a data structure associated with the UE, and may receive, when the UE includes a payload of data packets to transmit to the RAN, a signal from the RAN. The UE may determine, based on the signal, whether the RAN is a same RAN that provided the resource information, and may determine whether a strength of the signal from the RAN satisfies a threshold when the RAN is the same RAN that provided the resource information. The UE may attach to the RAN when the strength of the signal satisfies the threshold, and may provide the payload to the RAN via a random access channel of the RAN.

20 Claims, 8 Drawing Sheets

SYSTEMS AND METHODS FOR DYNAMIC PRIORITIZED TRANSMISSION AND RECEIPT OF DATA PACKETS TO AND FROM A RADIO ACCESS NETWORK DURING AN ATTACH PROCEDURE

BACKGROUND

A user equipment (UE) may attempt to access a radio access network (RAN) using a random access channel (RACH) attach procedure. The attach procedure allows the UE to establish a connection with a RAN device (e.g., a gNodeB, a base station, an eNodeB, and/or the like) that serves the UE.

DETAILED DESCRIPTION OF PREFERRED EMBODIMENTS

The following detailed description of example implementations refers to the accompanying drawings. The same reference numbers in different drawings may identify the same or similar elements.

A current attach procedure for a UE with a RAN begins with a random access attempt of the RAN by the UE. If the random access attempt is successful, the UE may be configured for resources used at attach in order to transmit and/or receive data packets (user application packets). Unfortunately, the current attach procedure adds latency to UE access of the RAN, which prevents the UE from transmitting and/or receiving data packets. Another procedure is provided to release the UE from the RAN whenever the UE enters into an idle state. When the released UE has data packets to transmit and/or receive, the UE reattaches to the RAN using the current attach procedure and the random access attempt. In RANs, such as fourth generation (4G) and fifth generation (5G) RANs, the current attach procedure is reserved for transmission of over-the-air (OTA) signaling-related data. Thus, the current attach procedure inefficiently utilizes and wastes computing resources (e.g., processing resources, memory resources, communication resources, and/or the like), networking resources, and/or the like associated with preventing data packets from being transmitted and/or received during an attach with the RAN, causing delays in transmission and/or reception of the data packets, and/or the like.

Some implementations described herein provide a UE that provides dynamic prioritized transmission and/or receipt of data packets to and/or from a RAN during an attach procedure. For example, the UE may receive, during release from the RAN, resource information associated with attaching to the RAN, wherein the resource information is received based on the UE being authenticated for transmitting and receiving data packets during a re-attach with the RAN. The UE may receive information that would make transmission at an initial stage (e.g., before dedicated signaling) to improve latency. For example, the UE may need to encrypt data for transmission, and an encryption configuration may be provided to the UE at release so that the encryption configuration may be used in fast reattach. A new encryption may be established once the UE attaches again to the RAN. To minimize contention during re-attach, the RAN may also provide, to the UE, resource information (e.g., which frequency and/or time slots to use) the UE is to utilize when the attempting to attach again to the same RAN. The UE may store the resource information in a data structure associated with the UE, and may receive, when the UE includes a payload of data packets to transmit to the RAN, a signal from the RAN. The UE may determine, based on the signal, whether the RAN is the same RAN that provided the resource information, and may subsequently determine whether a strength of the signal from the RAN satisfies a threshold. The UE may attach to the RAN when the strength of the signal satisfies the threshold, and may provide the payload to the RAN via a random access channel of the RAN.

In this way, the UE provides dynamic prioritized transmission and/or receipt of data packets to and/or from a RAN during a random access attach procedure. Based on the UE being authenticated and during release by the RAN, the UE may be provisioned (e.g., by the RAN) with resource information related to a next attach by the UE with the RAN. The resource information may be utilized by the UE to transmit and/or receive (e.g., in certain radio frequency (RF) conditions) data packets during a random access attempt. This would reduce latency and improve capacity for the UE by allowing the UE to transmit and/or receive data packets over more channels and at an earlier stage. Thus, the UE conserves computing resources, networking resources, and/or the like that would otherwise be inefficiently utilized and wasted in preventing data packets from being transmitted and/or received during an attach with the RAN, causing delays in transmission and/or reception of the data packets, and/or the like.

Figure 1A:
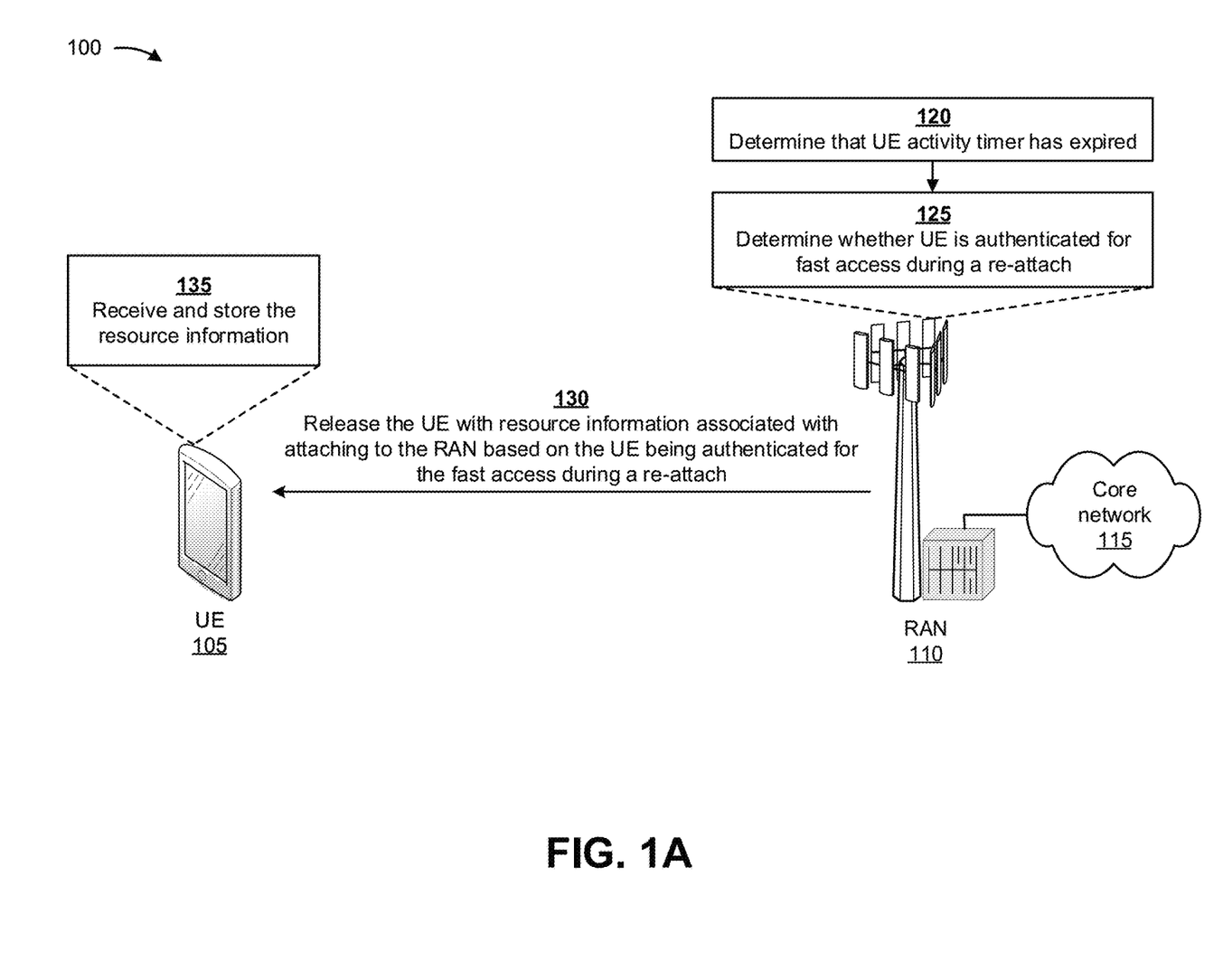
FIGS. 1A-1E are diagrams of one or more example implementations described herein.

FIGS. 1A-1E are diagrams of one or more example implementations 100 described herein. As shown in FIG. 1A, a user equipment (UE) 105 may be associated with a radio access network (RAN) 110 and a core network 115. UE 105 may include a mobile phone, a laptop computer, a tablet computer, and/or the like that attaches to RAN 110. RAN 110 may include one or more network devices (e.g., eNodeBs, gNodeBs, and/or the like) that provide UE 105 with access to core network 115. Core network 115 may include an example architecture of a 4G core network, a 5G core network included in a 5G wireless telecommunications system, and/or the like.

As further shown in FIG. 1A, and by reference number 120, RAN 110 may determine that a UE activity timer has expired. For example, the UE activity timer may expire due to inactivity associated with UE 105 (e.g., measured in seconds, minutes, and/or the like). The UE activity timer may also be referred to as a UE inactivity timer. When RAN 110 detects that UE 105 does not have traffic to send and/or receive during a defined period of time (e.g., defined by the UE activity timer), RAN 110 may initiate procedures to place UE 105 in an idle mode. The UE activity timer may be defined in RAN 110 and may be configurable.

As further shown in FIG. 1A, and by reference number 125, RAN 110 may determine whether UE 105 is authenticated for fast access during a re-attach. For example, a base station of RAN 110 may determine whether UE 105 supports a fast access procedure. In some aspects, a fast access procedure is one in which UE 105 will not have to be configured for resources at re-attach in order to transmit and/or receive data packets to and/or from RAN 110. RAN 110 may determine whether UE 105 may benefit from a fast access procedure in relation to applications used and/or a radio frequency (RF) condition at the time of release of UE 105, and may determine that UE 105 is authenticated for fast access during a re-attach only when UE 105 may benefit from a fast access procedure in relation to the applications used and/or the RF condition at the time of release of UE 105. For example, RAN 110 may determine that any data application type utilizes a small data payload (e.g., latency-sensitive applications, delay-sensitive applications, applications with small payloads, and/or the like) is eligible for the fast access procedure (e.g., a web request type where a session usually begins with a request before larger content is transmitted and/or received).

For example, UE 105 may benefit from the fast access procedure when UE 105 is released from RAN 110 and has data packets to transmit to and/or receive from RAN 110. UE 105 may utilize fast access procedure when reattaching to RAN 110 to transmit the data packets to or receive the data packets from RAN 110 during the attach procedure with RAN 110. This prevents delays in transmission and/or reception of the data packets, which may improve a user experience for a user of UE 105.

As further shown in FIG. 1A, and by reference number 130, RAN 110 may release UE 105 with resource information associated with attaching to RAN 110 based on UE 105 being authenticated for the fast access during a re-attach. The resource information may be based on Internet protocol (IP) and encryption configurations associated with data packets transmitted to and/or received by UE 105. Additionally, or alternatively, the resource information may include resource blocks to be allocated to UE 105 during a re-attach with RAN 110. The resource information may include additional data related to a resource information configuration to be used when UE 105 is released (e.g., a signature provided to UE 105 that indicates that UE 105 has been vetted and is authenticated). Additionally, or alternatively, the resource information may include a physical cell identity (PCI) list associated with base stations of RAN 110 that are able to forward data packets via an IP tunnel.

As further shown in FIG. 1A, and by reference number 135, UE 105 may receive and store the resource information. UE 105 may periodically receive the resource information, may receive the resource information based on a request, and/or the like. UE 105 may store the resource information in a data structure (e.g., a database, a table, a list, and/or the like) associated with UE 105. In some implementations, UE 105 receives information identifying a quantity of resource blocks to be allocated to UE 105 during a re-attach with RAN 110. In this case, the information identifying the quantity of resource blocks may correspond to the resource information, and the quantity of resource blocks may be dependent on quantities of resource blocks allocated to other UEs 105 associated with RAN 110. In this way, UE 105 may be configured at connection release with the resource information necessary to reattach in the future, and may receive and store the resource information for use in a future reattach procedure. Furthermore, by receiving and storing resource blocks to be allocated to UE 105 during a re-attach with RAN 110, and by receiving and storing information identifying a quantity of resource blocks to be allocated to UE 105 during re-attach with RAN 110, UE 105 may enable RAN 110 to more evenly distribute resources across UEs 105 that connect to RAN 110, which may allow for less contention at a next attempt to re-attach with RAN 110.

Figure 1B:
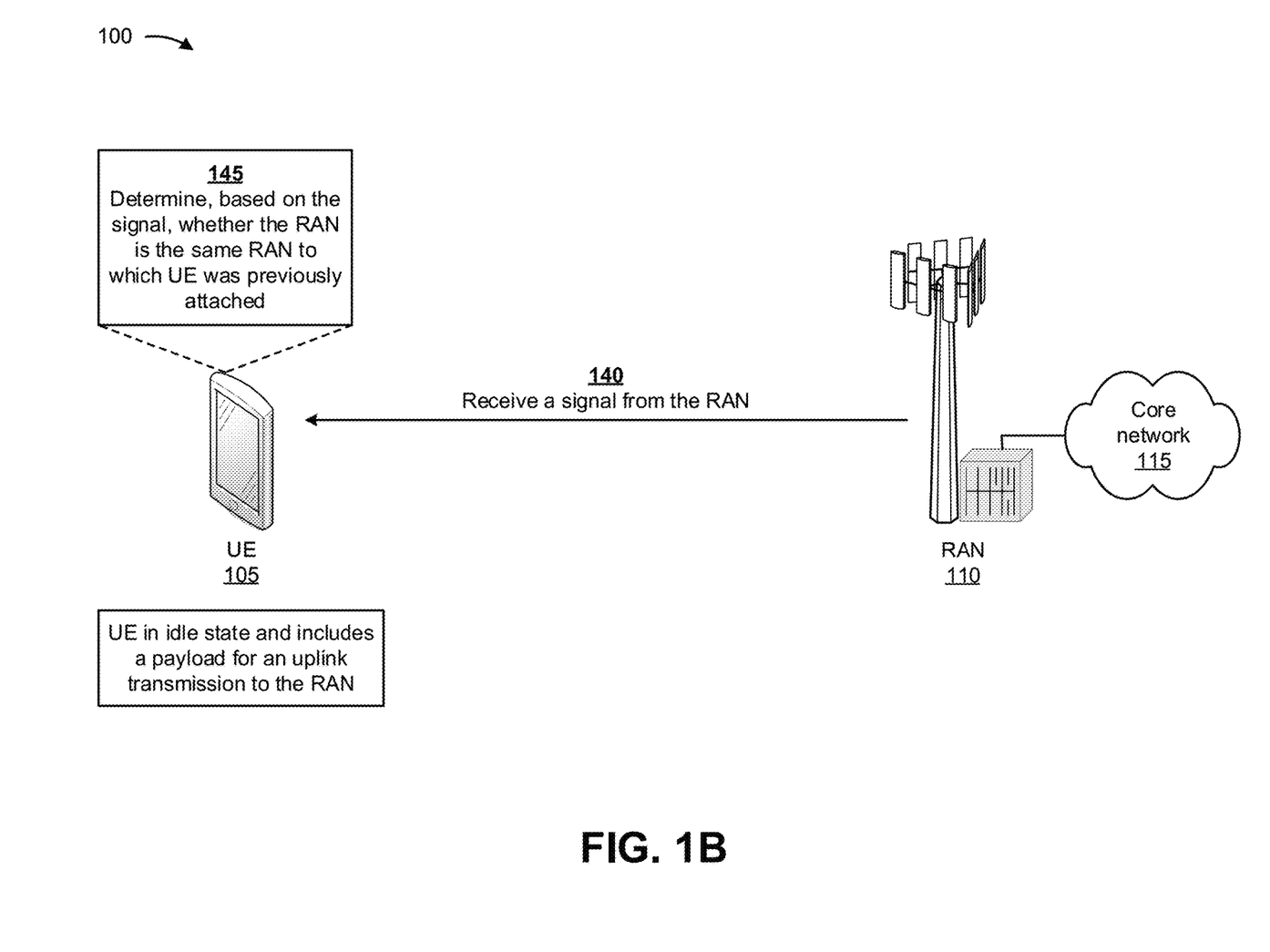

As shown in FIG. 1B, and by reference number 140, UE 105 may receive a signal from RAN 110. The signal may include a radio frequency (RF) signal generated by RAN 110. At the time the signal is received, UE 105 may be in an idle state, and may include a payload for an uplink transmission to RAN 110. In some implementations, UE 105 may periodically monitor the signal associated with RAN 110, and may determine a RAN measurement. For example, the RAN measurement may include a signal-to-noise ratio (SNR), a reference signal received power (RSRP), key performance indicators (KPIs), and/or the like for the signal.

As further shown in FIG. 1B, and by reference number 145, UE 105 may determine, based on the signal, whether RAN 110 is the same RAN 110 to which UE 105 was previously attached. For example, UE 105 may determine whether a base station of RAN 110, to which UE 105 is attempting to attach, is a same base station from which UE 105 was previously released. Additionally, or alternatively, UE 105 may determine, based on the signal, whether the base station is identified in a physical cell identity (PCI) list associated with base stations that are able to forward data packets on an IP tunnel.

Figure 1C:
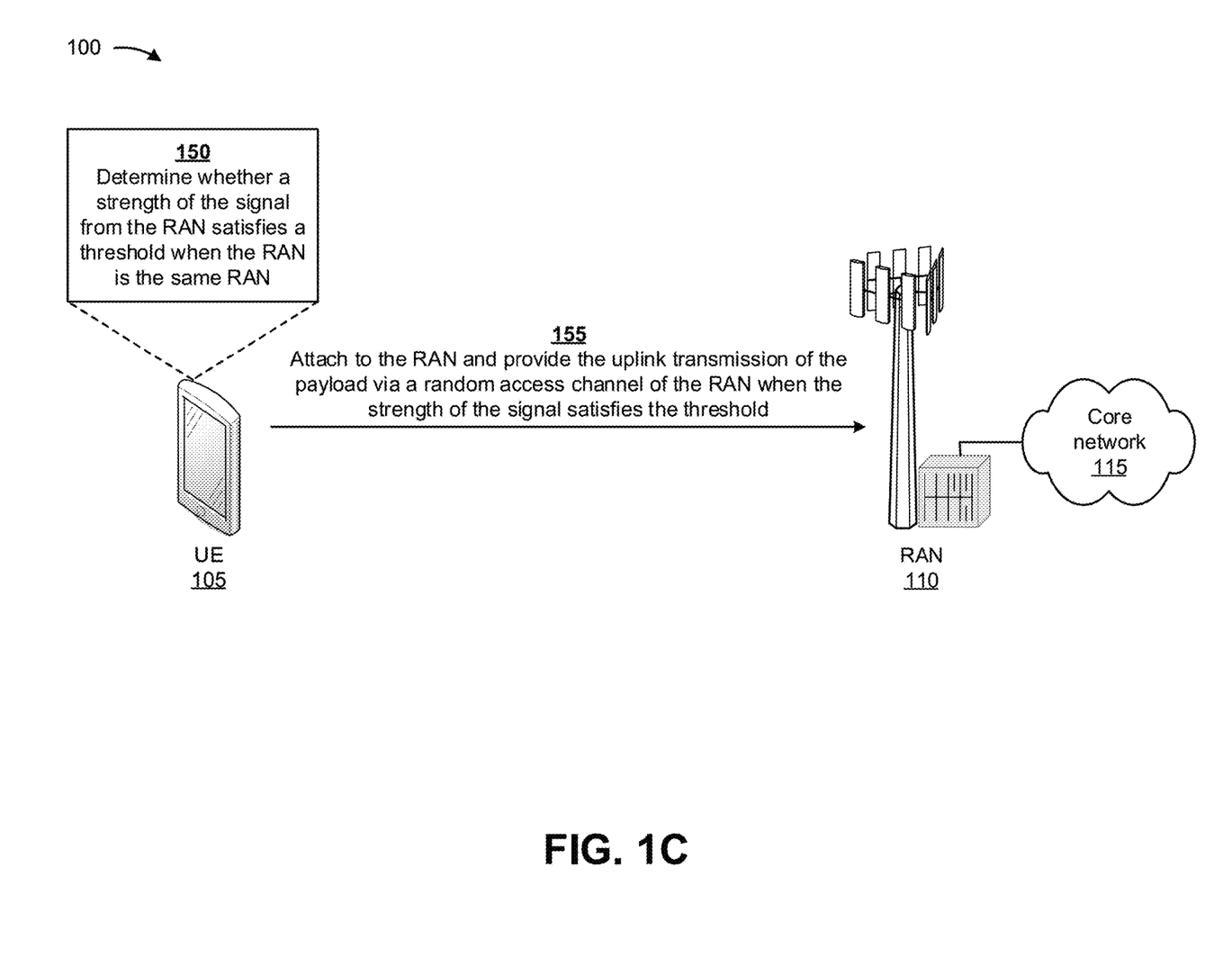

As shown in FIG. 1C, and by reference number 150, UE 105 may determine whether a strength of the signal from RAN 110 satisfies a threshold when RAN 110 is the same RAN to which UE 105 was previously attached. For example, UE 105 may determine whether the RAN measurement (e.g., the SNR, the RSRP, the KPIs, and/or the like) satisfies a signal strength threshold. When the RAN measurement is an RSRP measurement of a 5G signal, UE 105 may determine whether the RAN measurement satisfies a 5G threshold, such as an evolved-UMTS terrestrial radio access network (E-UTRAN) new radio-dual connectivity (EN-DC) add threshold, a new radio-dual connectivity (NR-DC) add threshold, a new radio-carrier aggregation (NR-CA) add threshold, and/or the like. By determining whether the strength of the signal from RAN 110 satisfies the threshold, UE 105 may determine whether the signal includes an RF condition that is sufficient to transmit a data payload in an uplink transmission.

As further shown in FIG. 1C, and by reference number 155, UE 105 may attach to RAN 110 and provide the uplink transmission of the payload via a random access channel of RAN 110 when the strength of the signal satisfies the threshold. For example, when UE 105 determines that the strength of the signal from RAN 110 satisfies the threshold, UE 105 may transmit the payload to RAN 110 via the random access channel of RAN 110 and without performing an authentication process with RAN 110.

In this way, by providing the payload to RAN 110 via the random access channel of RAN 110, UE 105 may reduce latency for UE 105 relative to not providing the payload to RAN 110 via the random access channel. In some implementations, UE 105 provides, to RAN 110, signaling data with the payload via the random access channel of RAN 110. In some implementations, UE 105 prevents provision of the payload to RAN 110, via the random access channel of RAN 110, when RAN 110 is not the same RAN that provided the resource information. In some implementations, UE 105 prevents provision of the payload to RAN 110, via the random access channel of RAN 110, when the strength of the signal fails to satisfy the threshold. In such situations, UE 105 may utilize the regular attach procedure to attach to RAN 110, and may provide the payload to RAN 110 once attached to RAN 110 via the regular attach procedure.

Figure 1D:
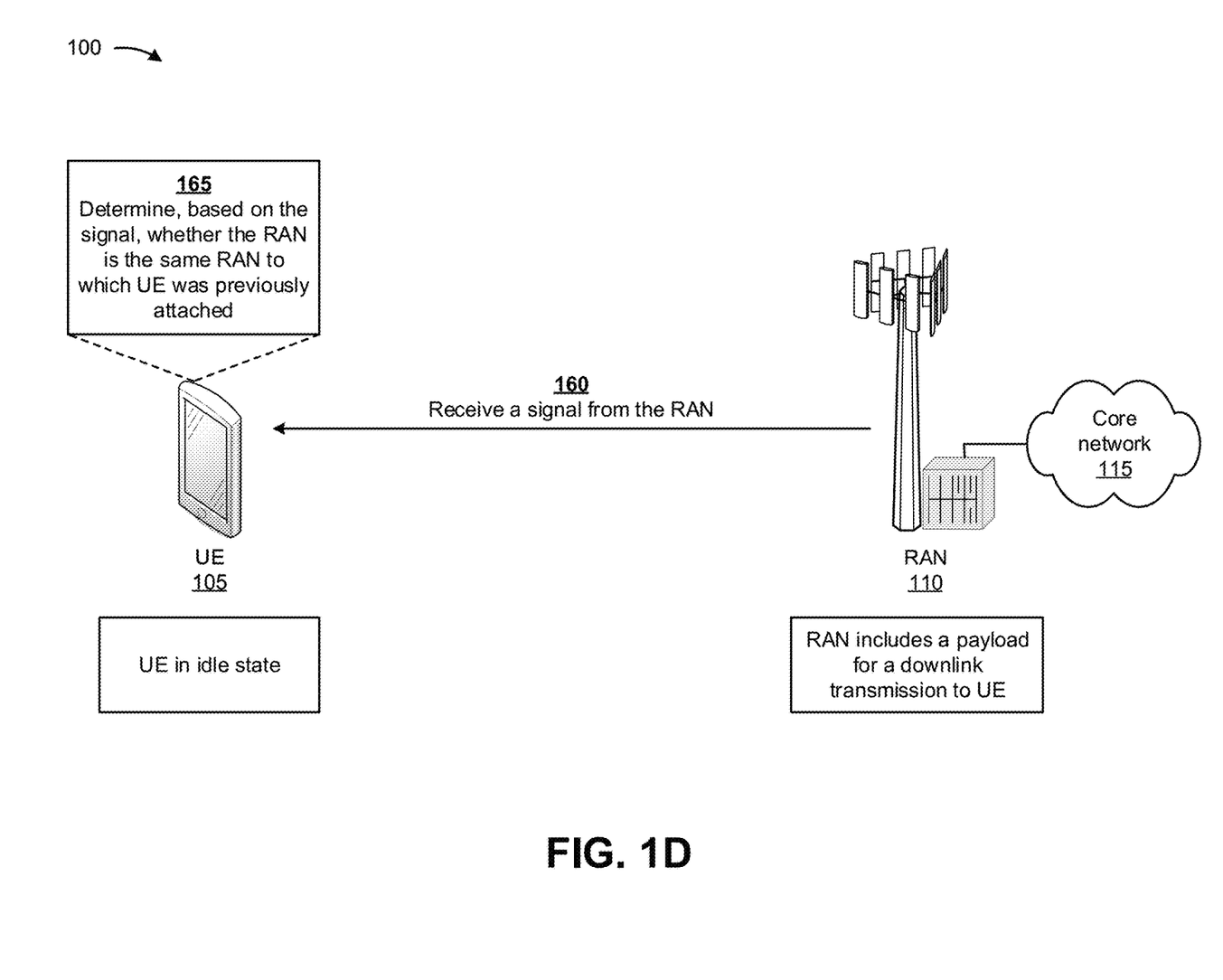

As shown in FIG. 1D, and by reference number 160, UE 105 may receive a signal from RAN 110. At the time the signal is received, UE 105 may have previously detached from RAN 110 and may be in an idle state. RAN 110 may include a payload for a downlink transmission to UE 105. For example, RAN 110 may include the payload for transmission to UE 105, and the signal may indicate that the payload is pending in RAN 110 for transmission to UE 105.

As further shown in FIG. 1D, and by reference number 165, UE 105 may determine, based on the signal, whether RAN 110 is the same RAN to which UE 105 was previously attached. For example, UE 105 may determine whether a base station of RAN 110, to which UE 105 is attempting to attach, is a same base station from which UE 105 was previously released. In some implementations, UE 105 may periodically monitor the signal associated with RAN 110, and may determine a RAN measurement (e.g., an SNR, an RSRP, KPIs, and/or the like) for the signal, as described above in connection with FIG. 1B.

Figure 1E:
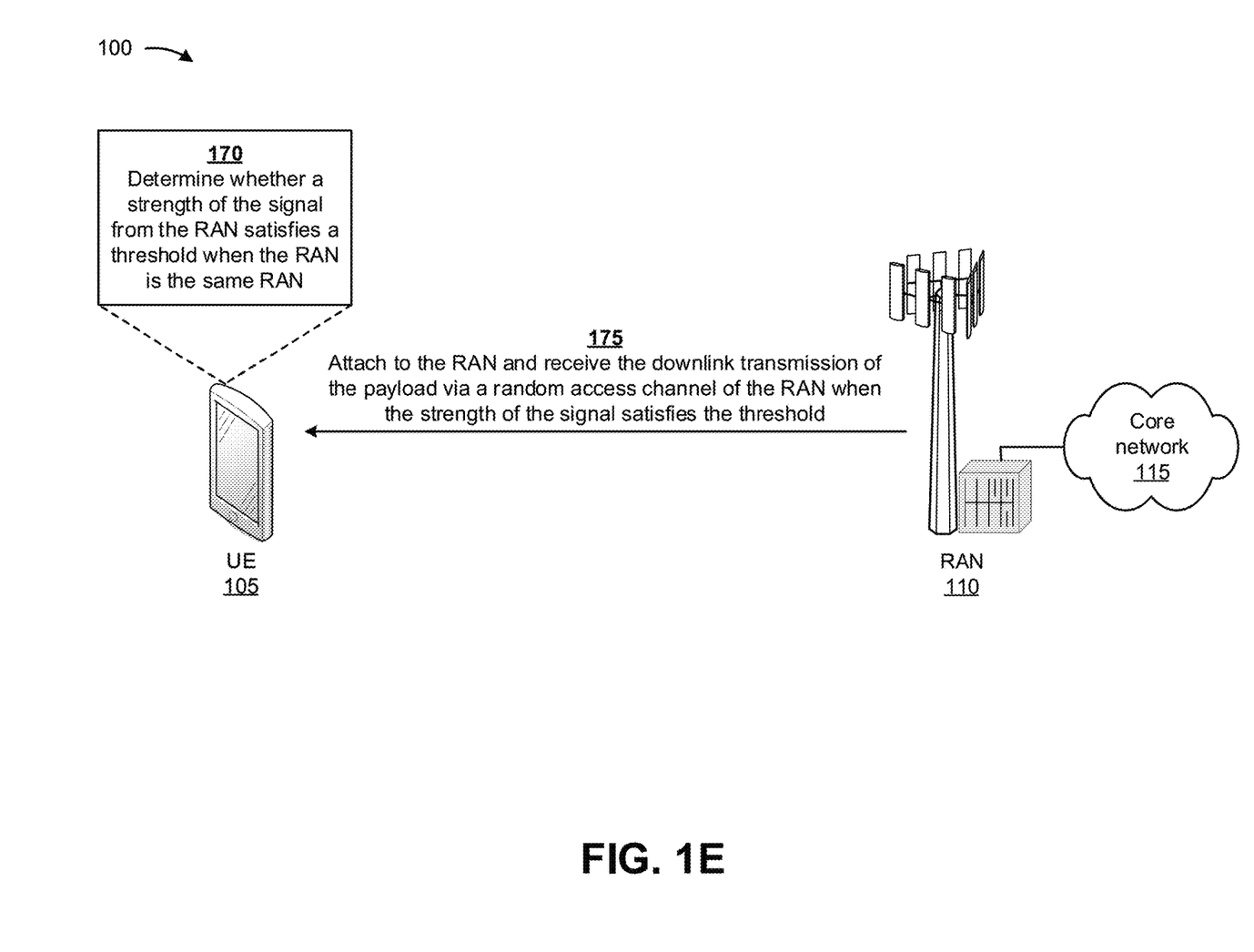

As shown in FIG. 1E, and by reference number 170, UE 105 may determine whether a strength of the signal from RAN 110 satisfies a threshold when RAN 110 is the same RAN to which UE 105 was previously attached. For example, UE 105 may determine whether the RAN measurement (e.g., the SNR, the RSRP, the KPIs, and/or the like) satisfies a signal strength threshold. When the RAN measurement is an RSRP measurement of a 5G signal, UE 105 may determine whether the RAN measurement satisfies a 5G threshold, such as an EN-DC add threshold, an NR-DC add threshold, an NR-CA add threshold, and/or the like, as described above in connection with FIG. 1B. By determining whether the strength of the signal from RAN 110 satisfies the threshold, UE 105 may determine whether the signal includes an RF condition that is sufficient to receive a data payload in a downlink transmission.

As further shown in FIG. 1E, and by reference number 175, UE 105 may attach to RAN 110 and may receive the downlink transmission of the payload via a random access channel of RAN 110 when the strength of the signal satisfies the threshold. For example, a base station of RAN 110 may attempt to send data packets along with connection attach information in a contention resolution message in an attach procedure, such as an MSG-4 message in a four message contention-based random access channel handshake procedure (e.g., managed by a radio network controller of RAN 110). The procedure may include a physical random access channel preamble (MSG-1) in which UE 105 randomly selects and transmits a preamble code to the base station of RAN 110 on the physical random access channel, and a random access response (MSG-2). The random access response may include detection of access requests sent by UEs 105 to RAN 110, assignment of a temporary cell radio network temporary identifier (TC-RNTI) to UEs 105, a resource grant in an uplink channel for subsequent message exchanges between UEs 105 and RAN 110, and/or the like. The procedure may also include a connection request (MSG-3) in which UE 105 sends the TC-RNTI assigned in MSG-2 over an uplink shared channel, and a connection request (MSG-4) that is a contention resolution message that UE 105 waits for the base station to send in a downlink shared channel. In this case, if a device identifier is present in the contention resolution message, UE 105 may send an acknowledgment (ACK) message to the base station, and if a device identifier is not present in the contention message, UE 105 may randomly select a back-off time before retrying transmission.

UE 105 may thereafter receive the downlink payload from RAN 110 via the random access channel of RAN 110. UE 105 may receive, from RAN 110, signaling data with the downlink payload via the random access channel of RAN 110. UE 105 may prevent reception of the downlink payload from RAN 110, via the random access channel of RAN 110, when RAN 110 is not the same RAN that provided the resource information. UE 105 may also prevent reception of the downlink payload from RAN 110, via the random access channel of RAN 110, when the strength of the signal fails to satisfy the threshold. In such situations, UE 105 may utilize the regular attach procedure to attach to RAN 110, and UE 105 may receive the payload from RAN 110 once attached to RAN 110 via the regular attach procedure.

In this way, UE 105 provides dynamic prioritized transmission and/or receipt of data packets to and/or from RAN 110 during an attach procedure. For example, UE 105 may prioritize particular applications or types of data in terms of how fast to transmit and/or receive data from RAN 110. The prioritized transmission and/or receipt of data may be based on radio frequency and payload data type to allow UE 105 to transmit and/or receive data faster over RAN 110. In another example, based on UE 105 being authenticated and during release by RAN 105, UE 105 may be provisioned (e.g., by RAN 110) with resource information related to a next attach by UE 105 with RAN 110. The resource information may be utilized by UE 105 to transmit (e.g., an uplink payload) and/or receive (e.g., a downlink payload received from RAN 110) data packets during a random access attempt with RAN 110. This would reduce latency and improve capacity for UE 105 by allowing UE 105 to transmit and/or receive data packets to and/or from RAN 110 over more channels and at an earlier stage. Thus, UE 105 conserves computing resources, networking resources, and/or the like that would otherwise be inefficiently utilized and wasted in preventing data packets from being transmitted and/or received during an attach with the RAN, causing delays in transmission and/or reception of the data packets, and/or the like.

As indicated above, FIGS. 1A-1E are provided merely as examples. Other examples may differ from what is described with regard to FIGS. 1A-1E. The number and arrangement of devices and networks shown in FIGS. 1A-1E are provided as an example. In practice, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of FIGS. 1A-1E may perform one or more functions described as being performed by another set of devices of FIGS. 1A-1E.

Figure 2:
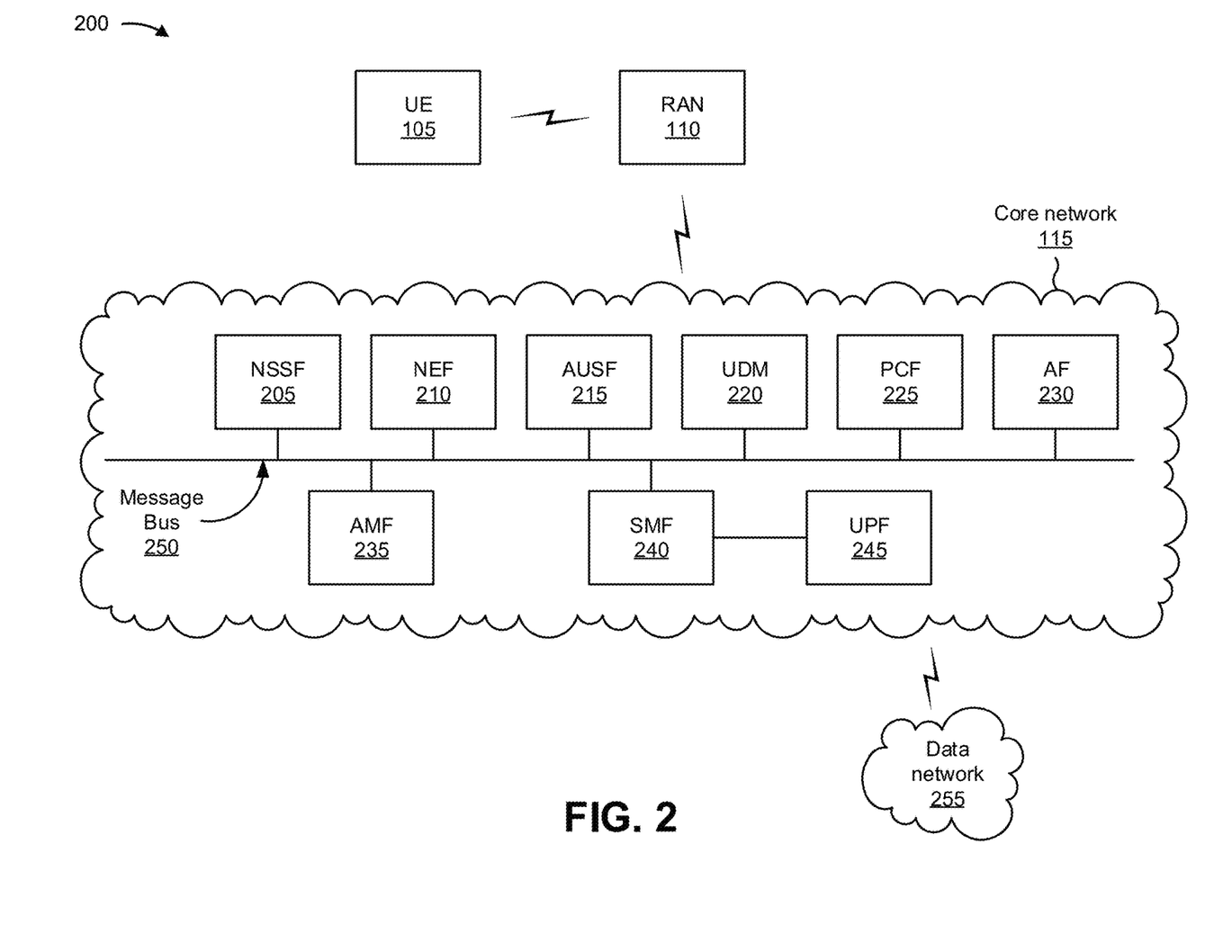
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include UE 105, RAN 110, core network 115, and a data network 255. Devices and/or networks of example environment 200 may interconnect via wired connections, wireless connections, or a combination of wired and wireless connections.

UE 105 includes one or more devices capable of receiving, generating, storing, processing, and/or providing information, such as information described herein. For example, UE 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 105. RAN 110 may transfer traffic between UE 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for UE 105 covered by RAN 110 (e.g., UE 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of UE 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture, a 4G core network, and/or the like.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for UE 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
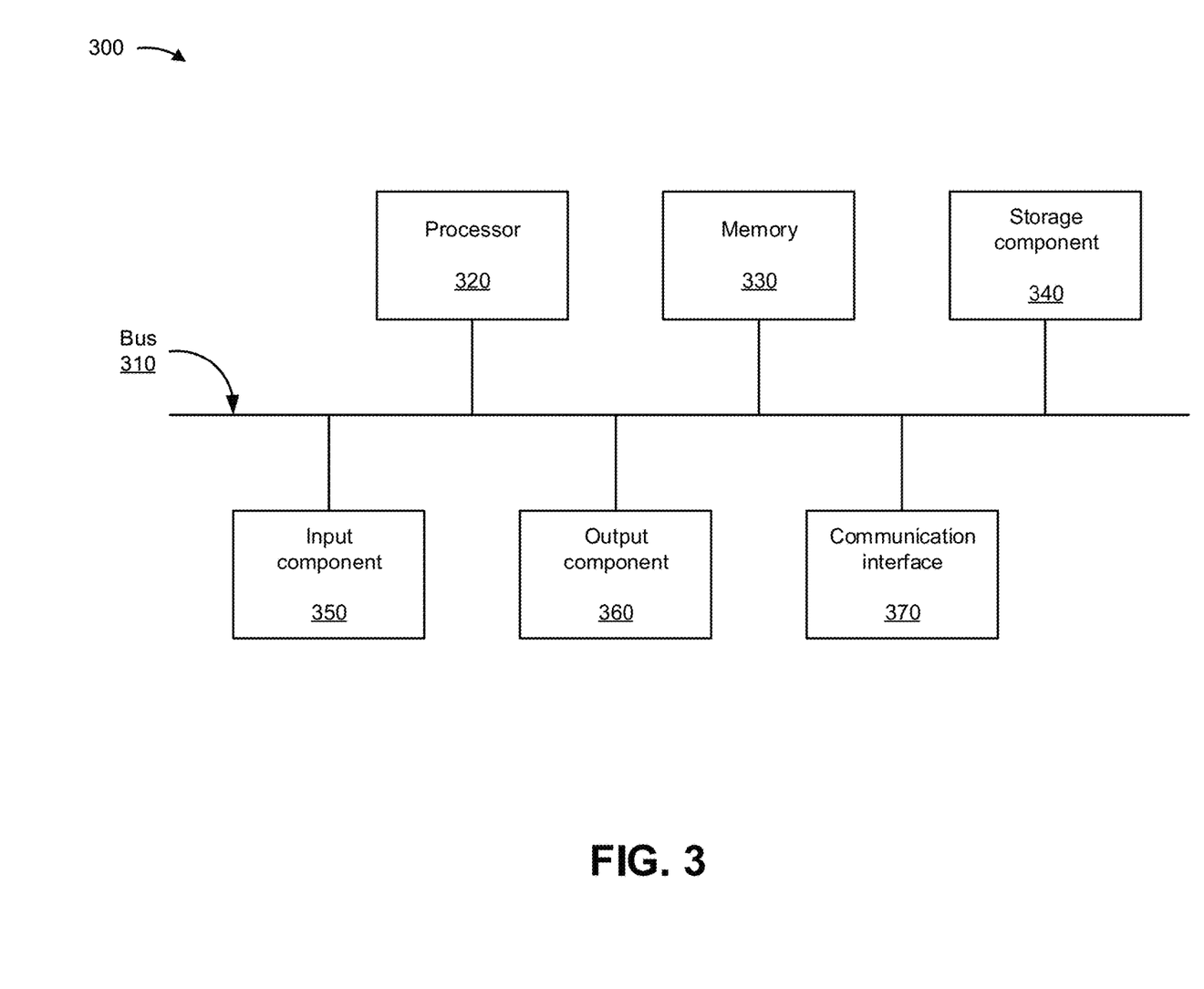
FIG. 3 is a diagram of example components of one or more devices of FIG. 2.

FIG. 3 is a diagram of example components of a device 300. Device 300 may correspond to UE 105, a base station of RAN 110, NSSF 205, NEF 210, AUSF 215, UDM 220, PCF 225, AF 230, AMF 235, SMF 240, and/or UPF 245. In some implementations, UE 105, the base station of RAN 110, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
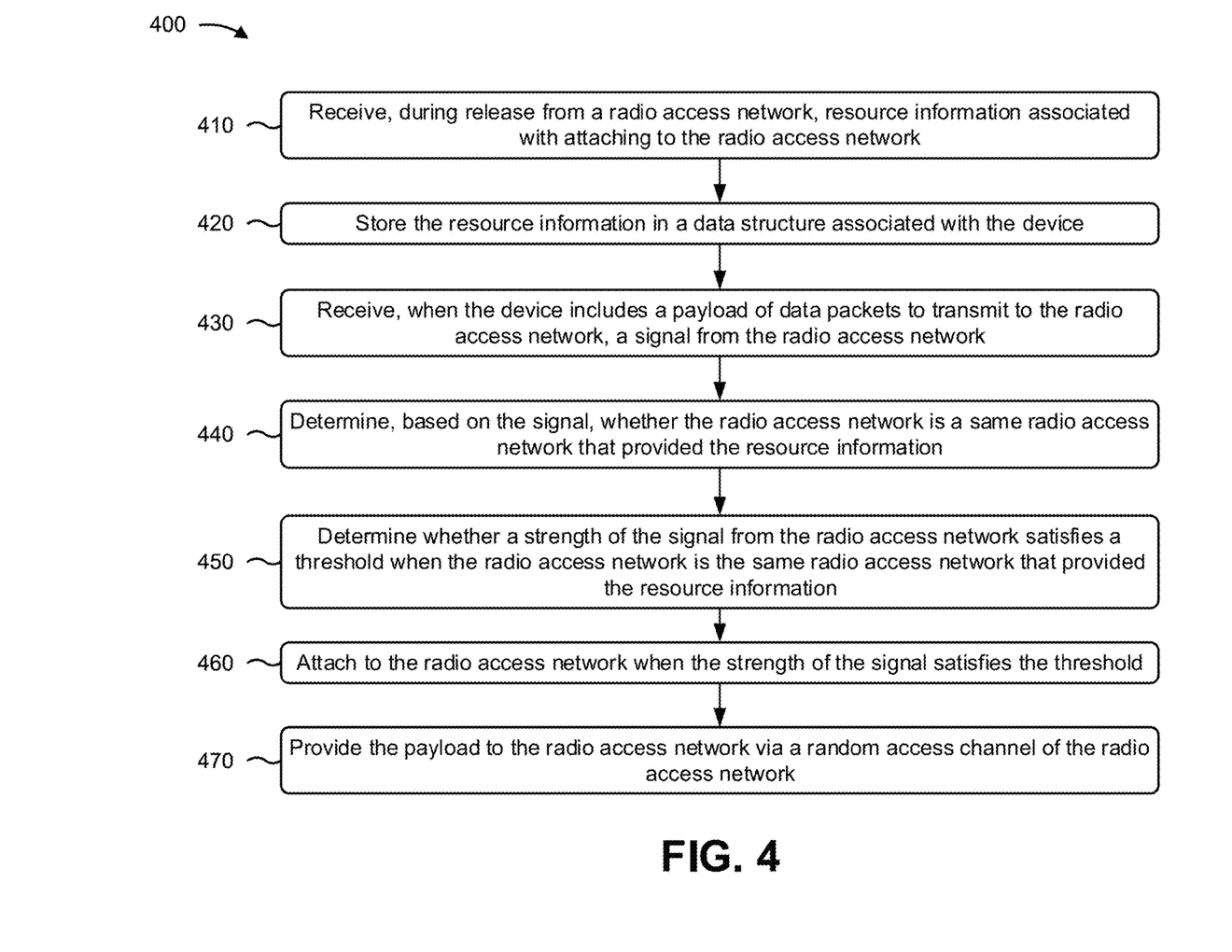
FIG. 4 is a flow chart of an example process for providing dynamic prioritized transmission and/or receipt of data packets to and/or from a RAN during an attach procedure.

FIG. 4 is a flow chart of an example process 400 for providing dynamic prioritized transmission and/or receipt of data packets to and/or from a RAN during an attach procedure. In some implementations, one or more process blocks of FIG. 4 may be performed by a device (e.g., UE 105). In some implementations, one or more process blocks of FIG. 4 may be performed by another device or a group of devices separate from or including the device, such as a RAN (e.g., RAN 110).

As shown in FIG. 4, process 400 may include receiving, during release from a radio access network, resource information associated with attaching to the radio access network, wherein the resource information is received based on the device being authenticated for transmitting and receiving data packets during a re-attach with the radio access network (block 410). For example, the device (e.g., using processor 320, communication interface 370, and/or the like) may receive, during release from a radio access network, resource information associated with attaching to the radio access network, as described above. In some implementations, the resource information may be received based on the device being authenticated for transmitting and receiving data packets during a re-attach with the radio access network. In some implementations, the device may include a user equipment, and the radio access network may include one of a base transceiver station, a radio base station, an eNodeB, or a gNodeB. In some implementations, the resource information may be based on Internet protocol and encryption configurations associated with data packets transmitted and received by the device. In some implementations, the resource information may include resource blocks to be allocated to the device during a re-attach with the radio access network.

As further shown in FIG. 4, process 400 may include storing the resource information in a data structure associated with the device (block 420). For example, the device (e.g., using processor 320, memory 330, and/or the like) may store the resource information in a data structure associated with the device, as described above.

As further shown in FIG. 4, process 400 may include receiving, when the device includes a payload of data packets to transmit to the radio access network, a signal from the radio access network (block 430). For example, the device (e.g., using processor 320, communication interface 370, and/or the like) may receive, when the device includes a payload of data packets to transmit to the radio access network, a signal from the radio access network, as described above.

As further shown in FIG. 4, process 400 may include determining, based on the signal, whether the radio access network is a same radio access network that provided the resource information (block 440). For example, the device (e.g., using processor 320, storage component 340, and/or the like) may determine, based on the signal, whether the radio access network is a same radio access network that provided the resource information, as described above.

As further shown in FIG. 4, process 400 may include determining whether a strength of the signal from the radio access network satisfies a threshold when the radio access network is the same radio access network that provided the resource information (block 450). For example, the device (e.g., using processor 320, memory 330, and/or the like) may determine whether a strength of the signal from the radio access network satisfies a threshold when the radio access network is the same radio access network that provided the resource information, as described above.

As further shown in FIG. 4, process 400 may include attaching to the radio access network when the strength of the signal satisfies the threshold (block 460). For example, the device (e.g., using processor 320, storage component 340, communication interface 370, and/or the like) may attach to the radio access network when the strength of the signal satisfies the threshold, as described above.

As further shown in FIG. 4, process 400 may include providing the payload to the radio access network via a random access channel of the radio access network (block 470). For example, the device (e.g., using processor 320, memory 330, storage component 340, communication interface 370, and/or the like) may provide the payload to the radio access network via a random access channel of the radio access network, as described above. In some implementations, providing the payload to the radio access network via the random access channel of the radio access network may reduce latency for the device relative to not providing the payload to the radio access network via the random access channel.

Process 400 may include additional implementations, such as any single implementation or any combination of implementations described below and/or in connection with one or more other processes described elsewhere herein.

In some implementations, process 400 may include detaching the device from the radio access network; receiving, when the radio access network includes another payload of data packets to transmit to the device, another signal from the radio access network; determining, based on the other signal, whether the radio access network is the same radio access network that provided the resource information; determining whether a strength of the other signal from the radio access network satisfies a threshold when the radio access network is the same radio access network that provided the resource information; attaching the device to the radio access network when the strength of the other signal satisfies the threshold; and receiving the other payload from the radio access network via the random access channel of the radio access network.

In some implementations, process 400 may include receiving, from the radio access network, signaling data with the other payload via the random access channel of the radio access network.

In some implementations, process 400 may include preventing the device from receiving the other payload from the radio access network, via the random access channel of the radio access network, when the radio access network is not the same radio access network that provided the resource information.

In some implementations, process 400 may include preventing the device from receiving the other payload from the radio access network, via the random access channel of the radio access network, when the strength of the other signal fails to satisfy the threshold.

In some implementations, process 400 may include providing, to the radio access network, signaling data with the payload via the random access channel of the radio access network.

In some implementations, process 400 may include receiving information identifying a quantity of resource blocks to be allocated to the device during a re-attach with the radio access network, wherein the information identifying the quantity of resource blocks may correspond to the resource information, and wherein the quantity of resource blocks may be dependent on quantities of resource blocks allocated to other devices associated with the radio access network.

In some implementations, process 400 may include preventing the device from providing the payload to the radio access network, via the random access channel of the radio access network, when the radio access network is not the same radio access network that provided the resource information.

In some implementations, process 400 may include preventing the device from providing the payload to the radio access network, via the random access channel of the radio access network, when the strength of the signal fails to satisfy the threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and during release from a radio access network, resource information associated with attaching to the radio access network,
wherein the resource information is received based on the device being authenticated for transmitting and receiving data packets during a re-attach with the radio access network;
storing, by the device, the resource information in a data structure associated with the device;
receiving, by the device and when the device includes a payload of data packets to transmit to the radio access network, a signal from the radio access network;
determining, by the device and based on the signal, that the radio access network is a same radio access network that provided the resource information;
determining, by the device, whether a strength of the signal from the radio access network satisfies a threshold when the radio access network is the same radio access network that provided the resource information;
attaching, by the device, to the radio access network when the strength of the signal satisfies the threshold; and
providing, by the device, the payload to the radio access network via a random access channel of the radio access network.

2. The method of claim 1, further comprising:
detaching the device from the radio access network;
receiving, when the radio access network includes another payload of data packets to transmit to the device, another signal from the radio access network;
determining, based on the other signal, whether the radio access network is the same radio access network that provided the resource information;
determining whether a strength of the other signal from the radio access network satisfies a threshold when the radio access network is the same radio access network that provided the resource information;
attaching the device to the radio access network when the strength of the other signal satisfies the threshold; and
receiving the other payload from the radio access network via the random access channel of the radio access network.

3. The method of claim 2, further comprising:
receiving, from the radio access network, signaling data with the other payload via the random access channel of the radio access network.

4. The method of claim 2, further comprising:
preventing the device from receiving the other payload from the radio access network, via the random access channel of the radio access network, when the radio access network is not the same radio access network that provided the resource information.

5. The method of claim 2, further comprising:
preventing the device from receiving the other payload from the radio access network, via the random access channel of the radio access network, when the strength of the other signal fails to satisfy the threshold.

6. The method of claim 1, wherein:
the device includes a user equipment, and
the radio access network includes one of a base transceiver station, a radio base station, an eNodeB, or a gNodeB.

7. The method of claim 1, further comprising:
providing, to the radio access network, signaling data with the payload via the random access channel of the radio access network.

8. A device, comprising:
one or more processors configured to:
store resource information in a data structure associated with the device,
wherein the resource information is associated with attaching to the radio access network, and
wherein the resource information is received by the device based on the device being authenticated for transmitting and receiving data packets during a re-attach with the radio access network;
receive, when the device includes a payload of data packets to transmit to the radio access network, a signal from the radio access network;
determine, based on the signal, whether the radio access network is a same radio access network that provided the resource information;
determine whether a strength of the signal from the radio access network satisfies a threshold when the radio access network is the same radio access network that provided the resource information;
attach to the radio access network when the strength of the signal satisfies the threshold; and
provide the payload to the radio access network via a random access channel of the radio access network.

9. The device of claim 8, wherein the resource information is based on Internet protocol and encryption configurations associated with data packets transmitted and received by the device.

10. The device of claim 8, wherein the resource information includes resource blocks to be allocated to the device during a re-attach with the radio access network.

11. The device of claim 8, wherein the one or more processors are further configured to:
receive information identifying a quantity of resource blocks to be allocated to the device during a re-attach with the radio access network,
wherein the information identifying the quantity of resource blocks correspond to the resource information, and
wherein the quantity of resource blocks is dependent on quantities of resource blocks allocated to other devices associated with the radio access network.

12. The device of claim 8, wherein the one or more processors are further configured to:

prevent the device from providing the payload to the radio access network, via the random access channel of the radio access network, when the radio access network is not the same radio access network that provided the resource information.

13. The device of claim 8, wherein the one or more processors are further configured to:

prevent the device from providing the payload to the radio access network, via the random access channel of the radio access network, when the strength of the signal fails to satisfy the threshold.

14. The device of claim 8, wherein providing the payload to the radio access network via the random access channel of the radio access network reduces latency for the device relative to not providing the payload to the radio access network via the random access channel.

15. A non-transitory computer-readable medium storing instructions, the instructions comprising:

one or more instructions that, when executed by one or more processors of a device, cause the one or more processors to:

receive, when the device includes a payload of data packets to transmit to a radio access network, a signal from the radio access network;

determine, based on the signal, whether the radio access network is a same radio access network that provided resource information, wherein the resource information is associated with attaching to the radio access network, and wherein the resource information is received by the device based on the device being authenticated for transmitting and receiving data packets during a re-attach with the radio access network;

determine whether a strength of the signal from the radio access network satisfies a threshold when the radio access network is the same radio access network that provided the resource information;

attach to the radio access network when the strength of the signal satisfies the threshold; and provide the payload to the radio access network via a random access channel of the radio access network.

16. The non-transitory computer-readable medium of claim 15, wherein the one or more instructions, when executed by the one or more processors, further cause the one or more processors to:

detach the device from the radio access network;

receive, when the radio access network includes another payload of data packets to transmit to the device, another signal from the radio access network;

determine, based on the other signal, whether the radio access network is the same radio access network that provided the resource information;

determine whether a strength of the other signal from the radio access network satisfies a threshold when the radio access network is the same radio access network that provided the resource information;

attach the device to the radio access network when the strength of the other signal satisfies the threshold; and receive the other payload from the radio access network via the random access channel of the radio access network.

17. The non-transitory computer-readable medium of claim 16, wherein the one or more instructions, when executed by the one or more processors, further cause the one or more processors to:

prevent the device from receiving the other payload from the radio access network, via the random access channel of the radio access network, when the radio access network is not the same radio access network that provided the resource information or when the strength of the other signal fails to satisfy the threshold.

18. The non-transitory computer-readable medium of claim 15, wherein the one or more instructions, when executed by the one or more processors, further cause the one or more processors to:

provide, to the radio access network, signaling data with the payload via the random access channel of the radio access network.

19. The non-transitory computer-readable medium of claim 15, wherein the one or more instructions, when executed by the one or more processors, further cause the one or more processors to:

prevent the device from providing the payload to the radio access network, via the random access channel of the radio access network, when the radio access network is not the same radio access network that provided the resource information.

20. The non-transitory computer-readable medium of claim 15, wherein the one or more instructions, when executed by the one or more processors, further cause the one or more processors to:

prevent the device from providing the payload to the radio access network, via the random access channel of the radio access network, when the strength of the signal fails to satisfy the threshold.

* * * * *